United States Patent [19]
Gerking

[11] Patent Number: 5,207,991
[45] Date of Patent: May 4, 1993

[54] REACTOR FOR HIGHLY VISCOUS MEDIA

[75] Inventor: Lüder Gerking, Berlin, Fed. Rep. of Germany

[73] Assignee: Karl Fischer Industrieanlagen GmbH, Berlin, Fed. Rep. of Germany

[21] Appl. No.: 691,075

[22] Filed: Apr. 25, 1991

[30] Foreign Application Priority Data

Apr. 26, 1990 [DE] Fed. Rep. of Germany ....... 4013912

[51] Int. Cl.⁵ .............................. B01J 8/08; B01F 7/00
[52] U.S. Cl. .................................. 422/210; 422/135;
422/225; 422/233; 366/294; 366/295; 366/296
[58] Field of Search ............... 366/294, 295, 296, 315, 366/317; 422/135, 138, 225, 229, 210, 233

[56] References Cited

U.S. PATENT DOCUMENTS

| 3,684,458 | 8/1972 | McCammon et al. | 23/285 |
| 3,762,947 | 10/1973 | Ornstein et al. | 366/320 |
| 4,655,701 | 4/1987 | Moriya | 366/294 |
| 4,900,158 | 2/1990 | Ugolini | 366/296 |

FOREIGN PATENT DOCUMENTS 547249 5/1956 Belgium .......................... 422/225

*Primary Examiner*—Robert J. Warden
*Assistant Examiner*—Christopher Y. Kim
*Attorney, Agent, or Firm*—Basile and Hanlon

[57] ABSTRACT

A reactor for highly viscous media with a horizontally oriented reactor casing having an inlet and an outlet in which a cage-like rotor is mounted in a rotary manner by means of stub shafts. To the cage-like rotor are fixed elements, e.g., rings, which are immersed in and thoroughly mix the media. A stripping rotor is provided coaxially with the cage-like rotor. Both rotors rotate within one another and mix and deliver the media and thereby form free surfaces. In addition, they also clean one another through a scraping action.

13 Claims, 1 Drawing Sheet

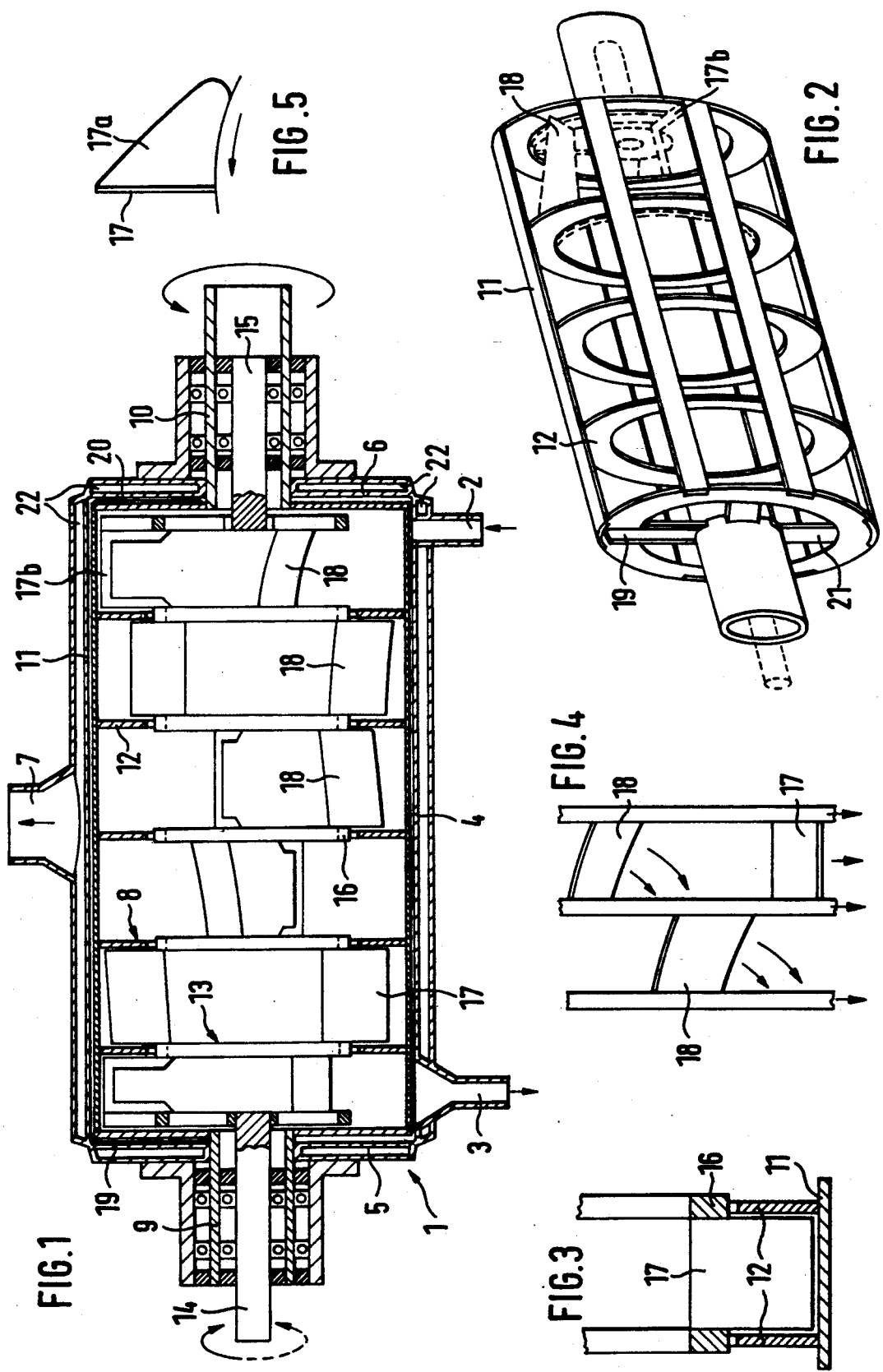

REACTOR FOR HIGHLY VISCOUS MEDIA

BACKGROUND OF THE INVENTION

The invention relates to a reactor for highly viscous media.

German Patent 21 00 615 discloses a reaction vessel for materials in the flowable state, in particular, for the polycondensation of prepolymers to high molecular weight polyester, which comprises a horizontally oriented reactor casing with an inlet at one end and an outlet at the other end and a cage-like device for moving and delivering the flowable material located in the lower region of the reactor interior and rotatable with limited clearance about a shaft running in the direction of the longitudinal axis of the reactor casing. The cage-like device has longitudinal struts and circular disks fixed to the struts. Successively the circular disks are inclined with respect to the rotation axis in the direction thereof in such a way that on rotating the cage-like device the materials are conveyed from the inlet to the outlet. It is possible with such a reaction vessel to both mix the flowable material and convey it in the reactor and to always re-form free surfaces.

It has been found that this reactor is not completely suitable for the treatment of highly viscous or pasty materials, such as polyamide, which is tougher than polyester, or polyester used for directly spun tire cords, because, although the reactor ensures the necessary shearing action and therefore mixing of the materials, it does not lead to a uniform self-cleaning which is necessary due to the adhesion of the highly viscous medium to the reactor elements.

SUMMARY OF THE INVENTION

The object of the present invention is to provide a reactor for highly viscous media, which are present in the form of a melt or in general terms as a highly viscous liquid, which ensures a good thorough mixing and delivery of the medium, while preventing a long adhesion of the medium within the reactor parts so as to obtain a uniform residence time for all of the particles of the medium.

According to the invention this object is achieved due to the fact that two rotors are rotating relative to one another, one mainly provided for mixing the medium and the other mainly for removing the attached medium. Thus, an excellent thorough mixing and uniform passage and narrow residence spectrum of the highly viscous medium is ensured. The second rotor is simultaneously constructed as a delivery means. Simultaneously all of the surfaces of the cage-like first rotor and, also, the reactor casing are scraped and cleaned. As there is no central shaft and, consequently, an adequate free space for the dripping or draining melt is available, large surfaces and free-falling films can be formed, which ensures very good thorough mixing and also leads to an improvement in the frequently desired and, in the case of chemical reactions, the necessary removal of volatile constituents. The second rotor delivers the medium in the flow direction so that the cage-like first rotor can have a simpler construction. A rotor system is made available which, in the case of good mixing, the exertion of a shearing action on the highly viscous medium, uniform delivery and good cleaning action, has a simple, lightweight construction.

As a result of the features of the invention, advantageous further developments and improvements are possible. Advantageously, the cage-like rotor has longitudinal struts constructed as scraping strips or bars for scraping the inner wall of the reactor casing and removing medium residues therefrom. If the longitudinal struts are arranged in a sloping manner, the delivery of the medium in the main flow direction axially through the reactor is assisted.

Due to the fact that the second rotor includes successively arranged rings to which stripping elements and guide surfaces are fixed to interconnect the rings, a lightweight rotor with an adequate rigidity is formed which only has limited surface areas so that little medium can adhere thereto. Advantageously every so often the second rotor is rotated in the direction opposite to the working rotation direction so that it is possible to remove pasty medium on the back of the stripping elements, e.g., by abrading means. The ploughshare-like construction of the stripping elements ensures a uniform delivery of the medium in the flow direction and at the same time a simple construction.

BRIEF DESCRIPTION OF THE DRAWINGS

An embodiment of the invention is described in greater detail hereinafter relative to the drawing in which:

FIG. 1 is a front elevational view of the inventive rotor, the outer cage-like rotor being shown in section and the inner, rotating stripping rotor being shown in elevation up to the end disks;

FIG. 2 is a perspective view of the cage-like rotor, with part of the stripping rotor shown in broken line form;

FIG. 3 is an enlarged representation of a stripping element of the stripping rotor between the cage-like rotor rings;

FIG. 4 is a partial, enlarged view of the stripping rotor showing two ploughshare-like delivery elements; and FIG. 5 is a partial, enlarged view of a section through the stripping rotor showing a rear-lined stripping surface.

DESCRIPTION OF THE PREFERRED EMBODIMENT

FIG. 1 shows a reactor 1, such as is used, for example, for the treatment of polyamide or highly viscous polyester. The reactor has an inlet 2 for charging the reactor 1 with the highly viscous or pasty medium and an outlet 3 through which the medium can be discharged. Within the reactor 1, the medium is delivered or conveyed from the inlet 2 to the outlet 3, whereby it is mixed, thoroughly stirred and subject to large surface formation. The reactor vessel or casing 4 is a conventional jacket-heated, double-walled vessel with an inner wall 4 and inner end walls 5 and 6 which surround the highly viscous medium to be worked. In addition, outer walls and outer end walls are provided which, together with the inner walls 4, 5 and 6, form a heating or cooling jacket 22 in which a heating or cooling medium can be introduced for heating or cooling the highly viscous medium.

On the inside of the upper part of the reactor casing there is provided a connection 7 through which the volatile constituents of the highly viscous medium can be removed. Frequently, the interior of the reactor 1 is kept under a vacuum in order to facilitate degassing.

A cage-like rotor 8 is placed in the reactor 1 by means of stub shafts 9 and 10 which are mounted in a rotary manner on the end faces within the reactor casing. As shown in FIG. 2, the cage-like rotor 8 includes longitudinally positioned scraping strips 11 to which circular disks 12 are fixed perpendicularly to the longitudinal axis of the rotor 8. The circular disks 12 can have different designs, e.g., they can be provided with holes, or they can be grid or lattice-like.

Concentrically with respect to the cage-like rotor 8, a stripping rotor 13 is rotatably mounted by means of stub shafts 14 and 15 which are in turn guided in the stub shafts 9 and 10 of the cage-like rotor 8. The cage-like rotor 8 and the stripping rotor 13 can be rigidly coupled together, for example, by means of a planetary gear. The rotors 8 and 13 can rotate in the same or opposite directions, with the speeds thereof being selected in accordance with the desired effect with regard to thorough mixing, shearing and delivery speed.

The stripping rotor 13 includes rings 16, FIG. 3, between which are fixed the stripping element 17 such that the stripping rotor 13 is in the form of a rigid unit. All or some of the stripping elements 17 can be constructed as delivery elements 18 and can have, for example, a ploughshare shape as shown in FIG. 4. Instead of constituting entire surfaces, it is sufficient for the stripping elements 17 to be constructed as angle frames 17b, as shown in hidden lines in FIG. 2.

Obviously the stripping or delivery elements 17 can also be constructed as hooks or the like. The stripping or delivery elements 17, 18 can additionally be provided with reinforcements. As shown in FIG. 3, the stripping elements 17 scrape both of the lateral faces of the circular disks 12 and the inner faces of the scraping strips 11, while the scraping strips 11 scrape the inner face of the reactor casing 4. Adhering material can constantly be removed from the end walls 5 and 6 by the scraping surfaces 19 and 20 on the connecting elements 21, generally in the form of spokes between the cage-like rotor 8 and the stub shafts 9 and 10. This can take place in the same way between the two rotors on the end faces thereof, which is not shown in the drawing.

As a result of this arrangement, there are virtually no non-stripable surfaces. The backs of the stripping or delivery elements 17, 18 can be cleaned when the stripping rotor 13 is occasionally rotated in the opposite direction to its working rotation direction. It is helpful if the stripping elements 17 and, optionally, also the delivery elements 18 are appropriately lined on the back, as shown by reference number 17a in FIG. 5. This assists the cleaning action during reverse rotation and also prevents the formation of adhering deposits from the outset on the backs 17a of the elements 17, 18. It can be advantageous in the case of particularly viscous media if at least the cage-like rotor 8 is also heated.

The scraping strips 11 can be constructed as scooping strips and can also have an inclined setting in order to assist the delivery of the viscous medium. As a function of the strength requirement for the stripping rotor 13, which is essentially determined by the shearing and delivery forces to be absorbed by the stripping and delivery elements 17, 18, the rings 16 can be replaced by two firmly interconnected tubular tires to which the stripping elements 17, 18 are fixed.

The reactor 1 can operate continuously wherein identical quantities pass in through the inlet 2 and out through the outlet 3, or intermittently wherein a specific quantity of medium is treated for a specific time therein and is then emptied, e.g., by rotating a rotor in the opposite direction.

Other not described forms of the design of the elements are also possible which permit the mixing, delivery, surface formation and reciprocal cleaning of the viscous media on the two rotors rotating within one another. Thus, ring-like mixing elements can form an inner rotor and the outer rotor can not only scrape the cylindrical reactor casing 4; but also the mixing elements. Intermediate forms are possible. However, it is common to all of these that the one rotor rotates within the other so as to make it possible to scrape the surfaces except for very small residual areas, such as the inner ring surface of the ring shown in FIG. 1. The latter can also be constructed in a flow-favorable manner to achieve a better outflow of the materials.

What is claimed is:

1. A reactor for a viscous medium comprising:
   a horizontally oriented reactor casing with an inlet and an outlet;
   first rotor means rotatably mounted in the reactor casing for thoroughly mixing, during rotation, the viscous medium entraining part of the medium in the rotation direction and forming free surface through the draining and dripping off of the medium from the first rotor means;
   second rotor means, rotatably mounted in the reactor casing coaxially with respect to the first rotor means, for removing medium adhering to the first rotor means and forming a free central working area within the first and second rotor means; and
   at least one of the first and second rotor means having conveying means formed thereon for conveying the medium from the inlet to the outlet, the one of the first and second rotor means rotating within the other of the first and second rotor means.

2. The reactor according to claim 1 wherein the second rotor means is rotatably mounted within the first rotor means.

3. The reactor according to claim 1 wherein the outer circumference of the first rotor means is disposed at a predetermined distance from the inner circumference of the reactor casing for scraping of the medium from the inner wall of the reactor casing by the first rotor means.

4. The reactor according to claim 1 wherein the first rotor means comprises a cage formed by a plurality of spaced circular disks connected together by connecting means.

5. The reactor according to claim 4 wherein the connecting means comprises longitudinal scraping strips.

6. The reactor according to claim 5 wherein the longitudinal scraping strips are inclined with respect to a longitudinal axis of the first rotor means to aid in the conveying of the medium.

7. The reactor according to claim 1 wherein the second rotor means comprises successively arranged, spaced ring interconnected by stripping elements.

8. The reactor according to claim 7 wherein some of the stripping elements are inclined with respect to the longitudinal axis of the first rotor means to form the conveying means.

9. The reactor according to claim 8 wherein some of the stripping elements have a ploughshare shape.

10. The reactor according to claim 1 wherein at least the first rotor means is heated.

11. The reactor according to claim 7 wherein the stripping elements are lined on their back surface with a plate mounted thereon.

12. A reactor for a viscous medium comprising:
a horizontally oriented reactor casing with an inlet and an outlet spaced apart in the reactor casing;
first rotor means, rotatably mounted in the reactor casing, for thoroughly mixing, during rotation, the viscous medium entraining part of the medium in the rotation direction and forming free surfaces through the draining and dripping off of the medium from the first rotor means;
the first rotor means comprising a cage including a plurality of spaced, circular disks connected together by spaced longitudinal scraping strips;
second rotor means, rotatably mounted in the reactor casing coaxially with and rotating within the first rotor means, for removing medium adhering to the first rotor means and for forming a free central working area within the first and second rotor means;
the second rotor means including successively arranged, spaced rings interconnected by stripping elements, the stripping elements having exterior surfaces disposed at a predetermined distance with the first rotor means for scraping medium from the first rotor means; and
at least one of the first and second rotor means having conveying means formed thereon for conveying the medium from the inlet to the outlet.

13. The reactor of claim 12 wherein:
the inlet is disposed at one end of the reactor casing and the outlet is disposed at another end of the reactor casing.

* * * * *